United States Patent [19]
Grattier et al.

[11] Patent Number: 5,135,710
[45] Date of Patent: Aug. 4, 1992

[54] FILTRATION PLATE ASSOCIATED WITH A LOWER CONNECTOR OF A FUEL ASSEMBLY OF A NUCLEAR REACTOR

[75] Inventors: Bernard Grattier, Dardilly; Jean-Francois Rondepierre, Lyons, both of France

[73] Assignees: Framatome, Courbevoie; Cogema, Velizy Villacoublay, both of France

[21] Appl. No.: 508,580

[22] Filed: Apr. 12, 1990

[30] Foreign Application Priority Data

Apr. 12, 1989 [FR] France ............................. 89 04838

[51] Int. Cl.⁵ ............................................ G21C 19/42
[52] U.S. Cl. ................................. 376/313; 376/310; 376/352
[58] Field of Search ............... 376/313, 310, 352, 439, 376/446

[56] References Cited

U.S. PATENT DOCUMENTS

| | | | |
|---|---|---|---|
| 4,664,880 | 5/1987 | Bryan | 376/352 |
| 4,678,627 | 7/1987 | Rylatt | 376/313 |
| 4,684,496 | 8/1987 | Wilson et al. | 376/352 |
| 4,832,905 | 5/1989 | Bryan et al. | 376/352 |
| 4,900,507 | 2/1990 | Shallenberger | 376/352 |
| 5,037,605 | 8/1991 | Riordan, III | 376/352 |

FOREIGN PATENT DOCUMENTS 0289829 9/1988 European Pat. Off. .
0311037 12/1989 European Pat. Off. .

Primary Examiner—Brooks H. Hunt
Assistant Examiner—Meena Chelliah
Attorney, Agent, or Firm—Pollock, Vande Sande & Priddy

[57] ABSTRACT

The filtration plate (10), arranged in the lower part of the fuel assembly and ensuring the retention of particles contained in the cooling fluid of the reactor, has at least one active zone where it is pierced with holes (12) of a size determined according to the size of the particles to be retained. The active zones of the filtration plate come into alignment with a water-passage hole through the lower core plate of the reactor when the assembly is in operation. The water-passage orifices of the filtration plate (10) can consist of cutouts of square or triangular form or of stamped parts of the plate or be delimited by parallel lamellae constituting a grating.

9 Claims, 4 Drawing Sheets a
FILTRATION PLATE ASSOCIATED WITH A LOWER CONNECTOR OF A FUEL ASSEMBLY OF A NUCLEAR REACTOR

FIELD OF THE INVENTION

The invention relates to a filtration plate of a lower connector of a fuel assembly for a nuclear reactor.

BACKGROUND OF THE INVENTION

Water-cooled nuclear reactors, especially reactors cooled by pressurized water, have a core consisting of prism-shaped fuel assemblies which are placed next to one another and arranged vertically and which rest on the lower core plate of the nuclear reactor by means of a lower connector. The cooling water of the reactor passes through the lower connector commonly called "bottom nozzle" and circulates from the bottom upwards in the vertical direction within the assembly.

This cooling water is liable to contain particles which it carries into the assembly through orifices passing through the adaptor plate of the lower connector. The particles come to rest in gaps located between the fuel rods and the walls of the cells of the first spacer grid of the assembly, i.e. the spacer grid located nearest to the lower connector of the assembly.

The circulating fluid subjects the particles to axial and transverse stresses, to the extent that this can result in wear of the jacket of the fuel rod. It is therefore desirable to retain the particles contained in the cooling fluid, in order to prevent them from penetrating into the assembly.

U.S. Pat. No. 4,664,880 and U.S. Pat. No. 4,678,627, for example, disclosed retention devices in the form of structures made of metal wires or of pierced sheet metal and arranged in the lower connector of the assembly.

It has also been proposed, in U.S. Pat. No. 4,684,496, to use as a retention device a filtration plate produced in the form of a grating consisting of wafers and associated with the lower connector of the assembly.

These known devices generally introduce a considerable head loss into the circulation of the cooling fluid of the reactor, inasmuch as the fluid passage cross-sections projected in a plane perpendicular to the flow cross-section may only be small.

EP-A-0,289,829 and EP-A-0,311,037 have also proposed producing the filtration device by using the very adaptor plate of the lower connector as a filter element, either by providing a special duct in this plate or by inserting filtration means locally in orifices machined specially in the adaptor plate. However, special machining of this essential structural element of the lower connector has disadvantages.

SUMMARY OF THE INVENTION

The object of the invention is, therefore, to provide a filtration plate of a lower connector of a fuel assembly of a nuclear reactor for the retention of particles contained in the cooling fluid of the reactor, the lower connector resting on the lower core plate of the reactor when the assembly is in operating position, the filtration plate introducing only a slight head loss into the circulation of the cooling fluid of the reactor, while at the same time ensuring effective filtration.

To this end, the filtration plate has at least one active zone where the plate is pierced with holes of determinate size intended for alignment with a water-passage hole through the lower core plate of the reactor.

BRIEF DESCRIPTION OF THE DRAWINGS

To facilitate comprehension of the invention, a plurality of embodiments of a filtration plate according to the invention will now be described with reference to the accompanying drawings.

DESCRIPTION OF PREFERRED EMBODIMENTS

Figure 1:
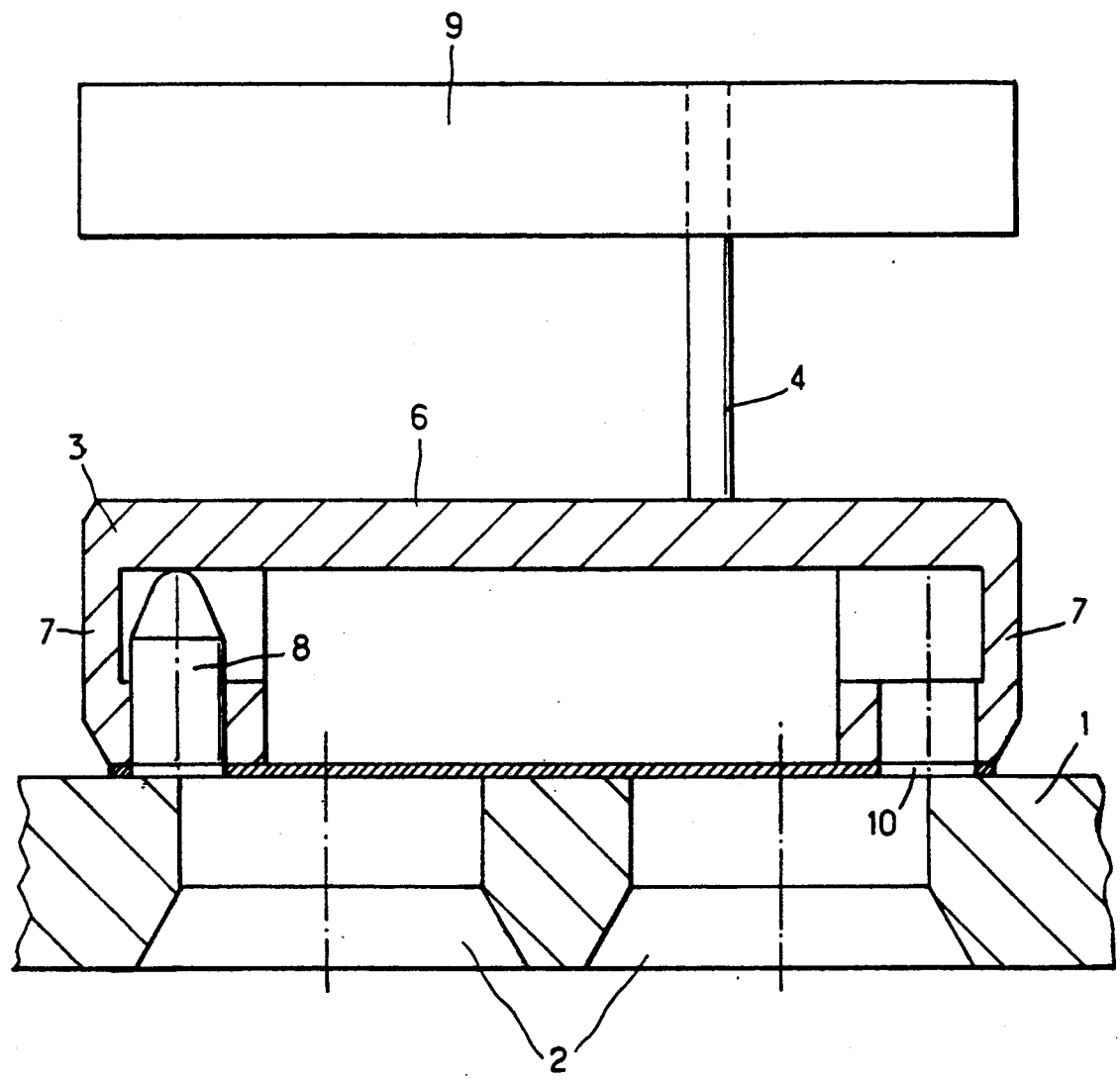
FIG. 1 is a schematic sectional view, taken in a vertical plane, of the lower part of a fuel assembly having a filtration plate according to the invention.

FIG. 1 shows part of the lower core plate 1 of a nuclear reactor, having water-passage holes 2 in the region of the lower connector 3 of a fuel assembly.

The lower connector 3 forms part of the framework of the assembly, to which the guide tubes 4 are connected in their lower part. The framework also includes a set of spacer grids connected to the guide tubes 4, only the lower spacer grid 9 being shown in FIG. 1.

The connector 3 comprises an adaptor plate 6 with feet 7 which come to rest on the upper surface of the lower coreplate 1.

The lower connector and the spacer grids have a substantially square form corresponding to the cross-section of the fuel assembly.

Two of the feet 7 of the lower connector 3 have orifices which engage onto centering and positioning studs 8 for the fuel assembly which are fastened to the upper face of the lower core plate 1.

A filtration plate 10 is inserted between the lower surface of the feet 7 and the upper surface of the lower core plate 1, so as to ensure the retention of particles contained in the cooling fluid of the reactor, before these particles can penetrate into the fuel assembly.

The cooling fluid of the reactor passes through the lower core plate 1 in the region of the passage holes 2 and subsequently penetrates into the fuel assembly via the orifices of the adaptor plate 6.

When a filtration plate 10 is interposed in the circulation of the cooling fluid at a level below the adaptor plate 6, this filtration plate 10 is capable of retaining the particles in circulation, inasmuch as this filtration plate has holes of determinate size making it possible to stop particles of a size greater than a particular limit. This limit is generally determined by the dimension of the gaps present between the fuel rods of the assembly and the cells of the first spacer grid 9 and is within a range of between two and four millimeters.

The active zones of the filtration plate 10, in which this filtration plate is pierced with orifices of determinate size, correspond substantially to the zones of the plate coming opposite the water-passage holes of the lower core plate when the assembly is in the operating position, as shown in FIG. 1.

These active zones have a generally circular form corresponding to the cross-section of the water-passage holes in the lower core plate.

Figure 2:
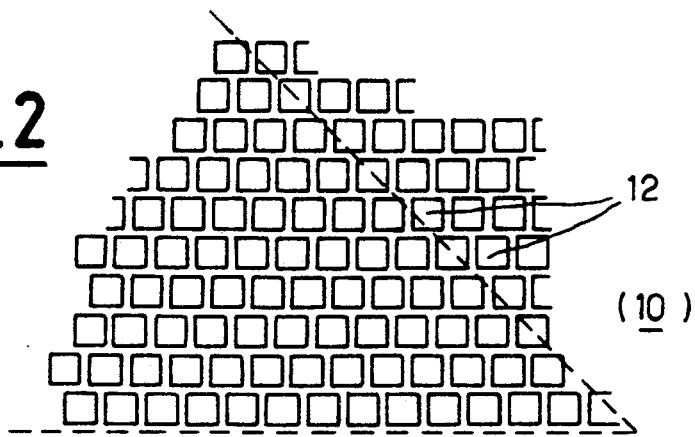
FIG. 2 is a plan view of a first embodiment of part of the active zone of a filtration plate according to the invention.

FIG. 2 shows part of an active zone of a filtration plate according to the invention, of which the water-passage and particle-retention orifices have a square form.

The orifices 12 cut out from the filtration plate have a side of a dimension corresponding to the minimum dimension of the particles to be retained.

FIG. 2 shows approximately one eighth of an active part of a filtration plate according to the invention, the radius of this active part corresponding to the radius of a water-passage hole 2 in the lower core plate.

Figure 3:
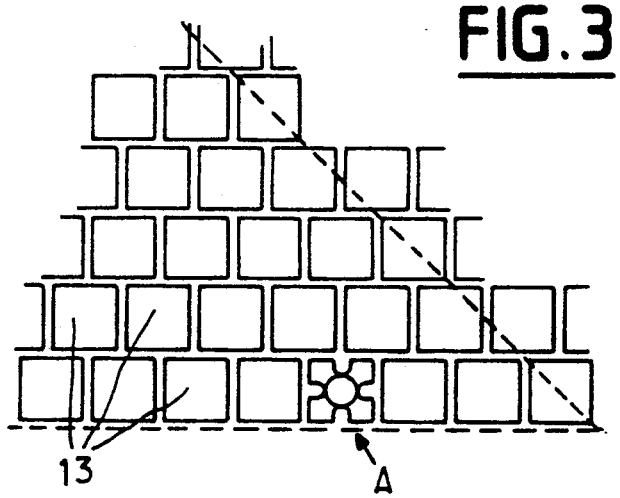
FIG. 3 is a plan view of a second embodiment of part of an active zone of a filtration plate according to the invention.

FIG. 3 shows an alternative embodiment, in which the square cutouts 13 passing through the filtration plate have a dimension substantially larger than the dimension of the cutouts 12 of the filtration plate shown in FIG. 2.

These cutouts of square form therefore have a dimension substantially larger than the minimum dimension of the particles to be retained.

Figure 3A:
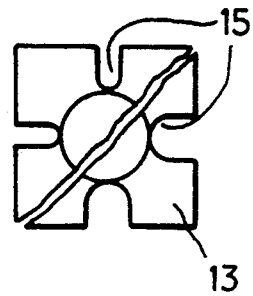
FIG. 3A is a view of the detail A of FIG. 3 on a larger scale.

As shown in FIG. 3A, it can be seen that each of the cells 13 of square form cut out from the filtration plate has four bosses 15 directed towards the inside of the cell. The bosses 15 delimit, within the cell 13, water-passage holes with a dimension smaller than the minimum dimension of the particles to be retained.

Figure 4:
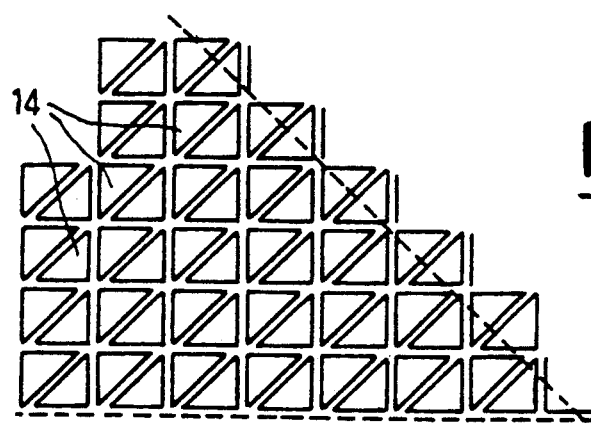
FIG. 4 is a plan view of a third embodiment of part of the active zone of a filtration plate according to the invention.

FIG. 4 shows a third embodiment of the active zone of a filtration plate according to the invention, this active zone comprising cutouts in the form of rightangled triangles 14 placed next to one another to form a water-passage and particle-retention network of a dimension greater than a particular limit dependent on the size of the triangular orifices 14.

Figure 5:
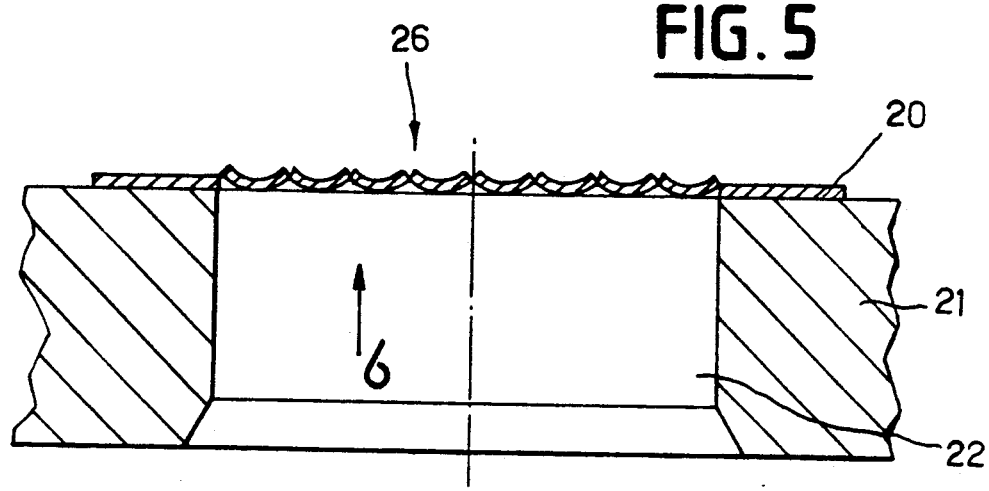
FIG. 5 is a view in vertical section of a filtration plate according to the invention, resting on the lower core plate of the nuclear reactor.
Figure 6:
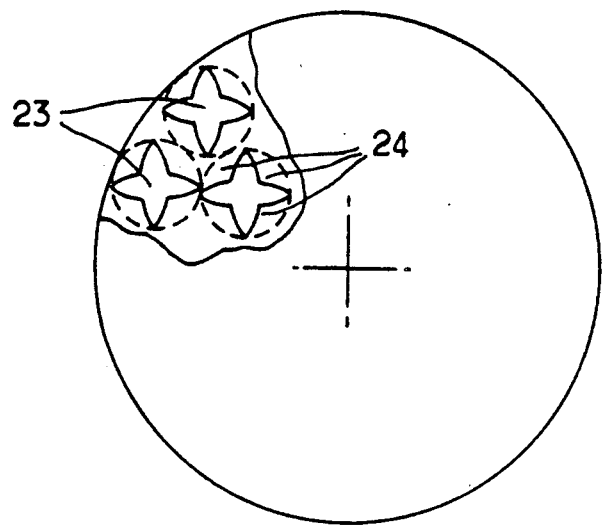
FIG. 6 is a partial view in the direction of arrow 6 of FIG. 5.

FIGS. 5 and 6 illustrate a fourth embodiment of the filtration plate according to the invention.

The plate 20 has an active zone which is located opposite each of the water-passage holes 22 of the lower coreplate 21 and in which the filtration plate 20 is stamped to form orifices 23, the form of which can be seen in FIG. 6. Each of the orifices 23 is delimited by four fins 24 pushed out of the plane of the plate 20 at the time of stamping.

The central passage hole 23 delimited by the fins 24 makes it possible to obtain the passage of water and retention of particles of a size greater than a particular limit.

If the filtration plate is produced by stamping, the stamped zone must correspond perfectly to the water-passage cross-section 22 in which it is received.

Figure 7:
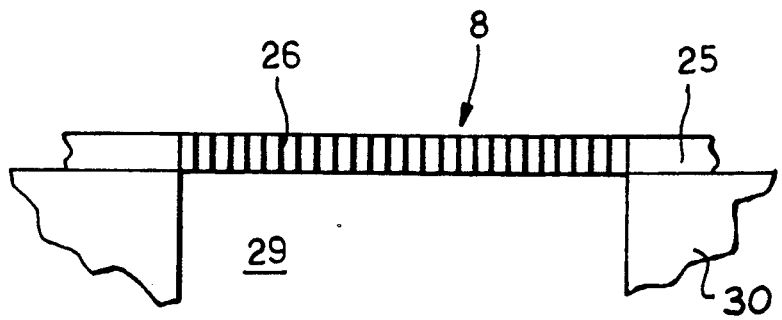
FIG. 7 is a partial sectional view of a filtration plate according to the invention produced in the form of a grating.
Figure 8:
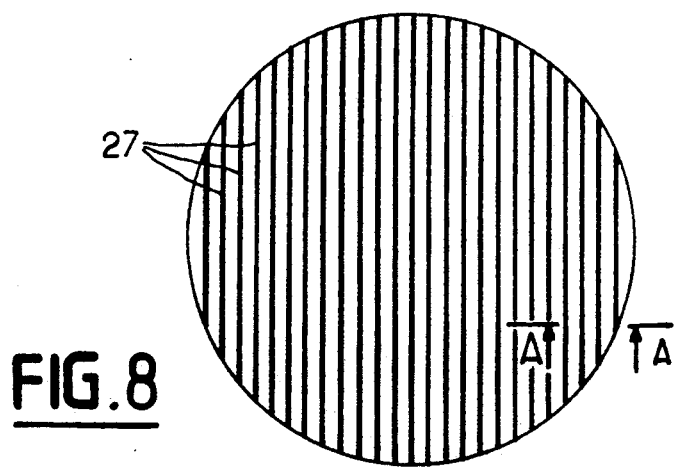
FIG. 8 is a plan view of FIG. 7.

FIGS. 7 and 8 illustrate a filtration plate 25, the active zone 26 of which is produced in the form of a grating comprising parallel lamellae 27, the spacing of which corresponds to the minimum size of the particles to be retained in the region of the filtration plate 25.

The lamellae 27 are placed next to one another within circular orifices which are made in the plate 25 and the dimension of which corresponds to the dimension of the water-passage holes 29 of the lower coreplate 30. These lamellae 27 can be welded at their ends to the edges of the orifice of the filtration plate.

Figure 8A:
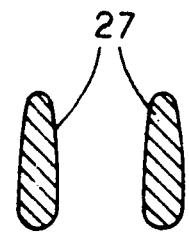
FIG. 8A is a large-scale cross-sectional view, in direction A—A of FIG. 8, of two bars of the grating shown in FIG. 8.

To limit the loss of head of the cooling fluid during the passage through the filtration plate 25, the lamellae 27 have a profiled form, as can be seen in FIG. 8A. This profiled form matched to the flow of the fluid in a direction perpendicular to the filtration plate allows an appreciable reduction of head loss.

The lamellae 27 of the active parts of the filtration plate 25 are fastened only at their ends and are all arranged parallel to one another. These lamellae are liable to vibrate under the effect of the hydraulic stresses of the cooling fluid passing through the active zones of the filtration plate 25.

Figure 9:
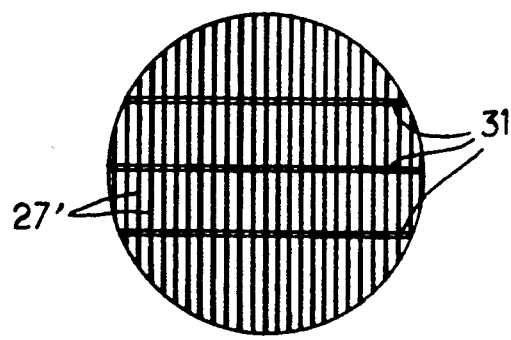
FIG. 9 is a plan view identical to that of FIG. 8, showing an alternative embodiment of the filtration grating.

To prevent these vibrations, it is possible to arrange stiffeners 31 in directions perpendicular to those of the lamellae 27', as can be seen in FIG. 9. The stiffeners 31 can be welded or otherwise fastened to the lamellae 27' and to the edges of the orifice passing through the filtration plate 25.

The filtration plate according to the invention ensures effective retention of the particles which are contained in the cooling fluid of the reactor and which are of a size greater than a particular limit.

This filtration plate introduces only a moderate head loss into the circuit of the cooling fluid, inasmuch as the orifices of the filtration plate are located in the extension of the passage orifices of the lower core plate.

If these orifices are made by the stamping of the plate, the deflector elements 24 of the plate are pointed in the direction of flow, thus making it possible to reduce the loss of head.

The perforations or orifices may be cut out or machined in the filtration plate in a manner and form different from those described.

The filtration plate can be produced from any material resistant to the cooling fluid and to the operating conditions of the reactor, for example from a nickel-based alloy or from martensitic steel.

The filtration plate according to the invention can be arranged not only in contact with the upper surface of the lower core plate, as described, but can also be arranged in the lower connector of the assembly in an intermediate position between its lower end and its adaptor plate, or be fastened in contact with the lower face of the adaptor plate.

At all events, the orifices of the filtration plate must be located opposite the cooling-fluid passage orifices passing through the lower core plate, in order to limit head losses.

The invention is used for any fuel assembly of a water-cooled nuclear reactor.

We claim:

1. Filtration plate arranged in the lower part of a fuel assembly of a nuclear reactor for retention of particles contained in cooling fluid of the reactor, said fuel assembly having a lower connector resting on a lower core plate of said reactor when said fuel assembly is in operating position, said filtration plate consisting of a single metal sheet having at least one active zone traversed by orifices of determinate size to be aligned with a water-passage hole through said lower core plate of said reactor and consisting of square cutouts, the side of which is of a dimension of the order of a minimum size of particles to be retained.

2. Filtration plate according to claim 1, wherein said orifices of said active zone consist of square cutouts, the side of which is of a dimension larger than a size of particles to be retained and within which bosses extend toward a center of the square and between them provide retention spaces of a direction corresponding to the size of said particles to be retained.

3. Filtration plate arranged in the lower part of a fuel assembly of a nuclear reactor for retention of particles contained in cooling fluid of the reactor, said fuel assembly having a lower connector resting on a lower core plate of said reactor when said fuel assembly is in operating position, said filtration plate consisting of a single metal sheet having at least one active zone traversed by orifices of determinate size to be aligned with a water-passage hole through said lower core plate of said reactor and consisting of triangular cutouts, a maximum dimension of whose sides correspond to a size of particles to be retained.

4. Filtration plate arranged in the lower part of a fuel assembly of a nuclear reactor for retention of particles contained in cooling fluid of the reactor, said fuel assembly having a lower connector resting on a lower core plate of said reactor when said fuel assembly is in operating position, said filtration plate consisting of a single metal sheet having at least one active zone traversed by orifices of determinate size to be aligned with a water-passage hole through said lower core plate of said reactor and consisting of stamped parts of said filtration plate, water passages being delimited by parts of said filtration plate which are raised to form deflectors in a direction of circulation of said cooling fluid.

5. Filtration plate arranged in the lower part of a fuel assembly of a nuclear reactor for retention of particles contained in cooling fluid of the reactor, said fuel assembly having a lower connector resting on a lower core plate of said reactor when said fuel assembly is in operating position, said filtration plate consisting of a single metal sheet having at least one active zone traversed by orifices of determinate size to be aligned with a water-passage hole through said lower core plate of said reactor, wherein said orifices are delimited by lamellae parallel to one another and arranged in an orifice of said filtration plate aligned with a water-passage hole of said lower core plate.

6. Filtration plate according to claim 5, wherein said lamellae have a cross-section profiled in a direction of circulation of said cooling fluid.

7. Filtration plate according to claim 5, comprising stiffeners fastened to said lamellae in a direction perpendicular to said lamellae.

8. Filtration plate according to claim 1, made of a nickel alloy with structural hardening.

9. Filtration plate according to claim 2, produced from a martensitic steel.

* * * * *